F. SIMONS.
WORKMAN'S TIME AND WAGE COMPUTING AND RECORDING APPARATUS.
APPLICATION FILED APR. 3, 1908.
975,296.
Patented Nov. 8, 1910.
7 SHEETS—SHEET 1.
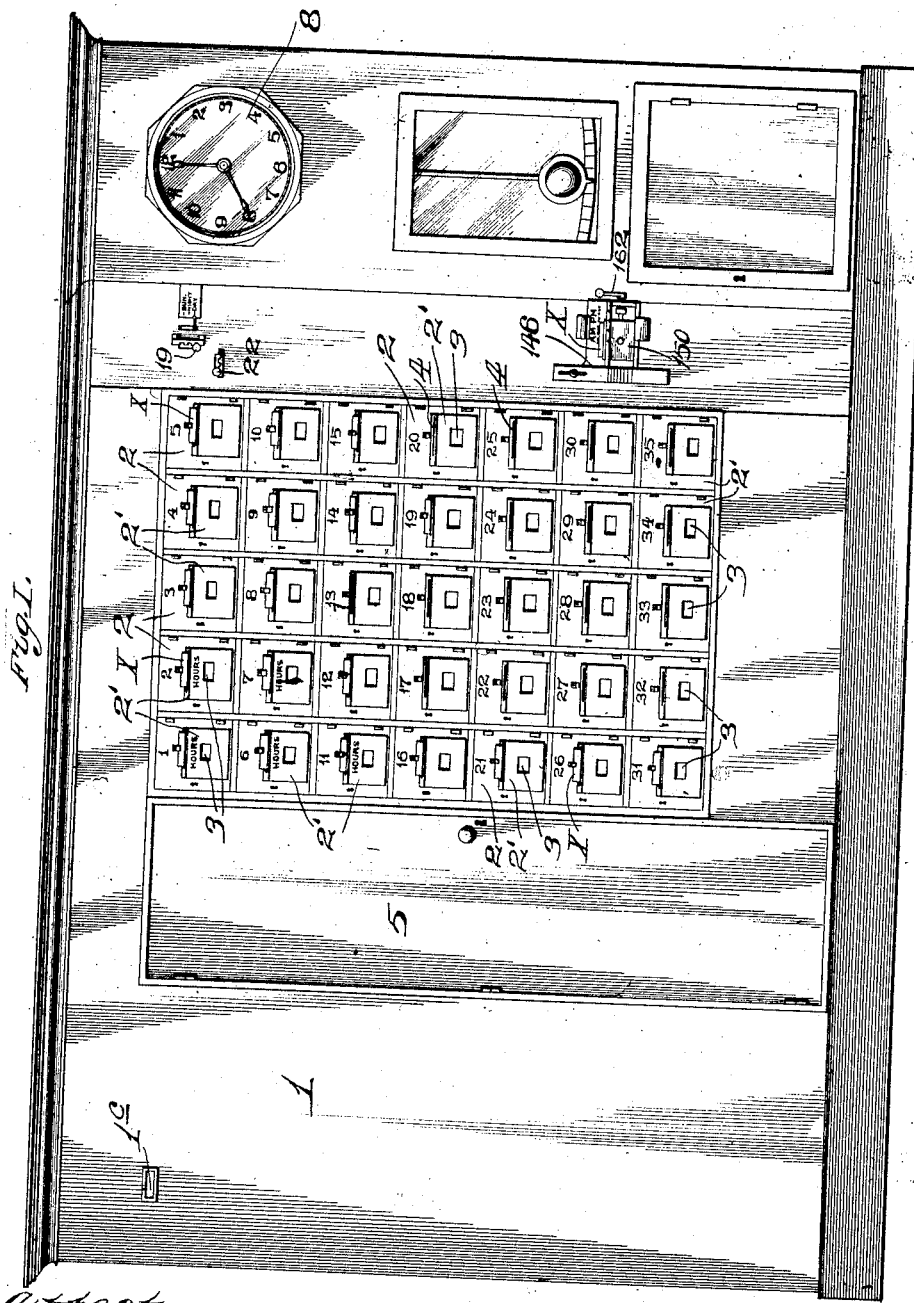

F. SIMONS.
WORKMAN'S TIME AND WAGE COMPUTING AND RECORDING APPARATUS.
APPLICATION FILED APR. 3, 1908.
975,296.
Patented Nov. 8, 1910.
7 SHEETS—SHEET 2.
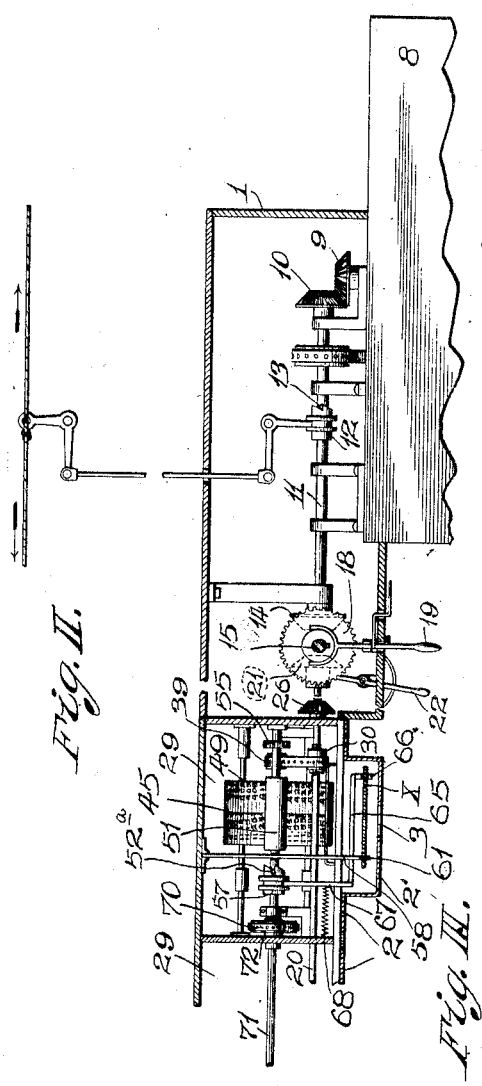
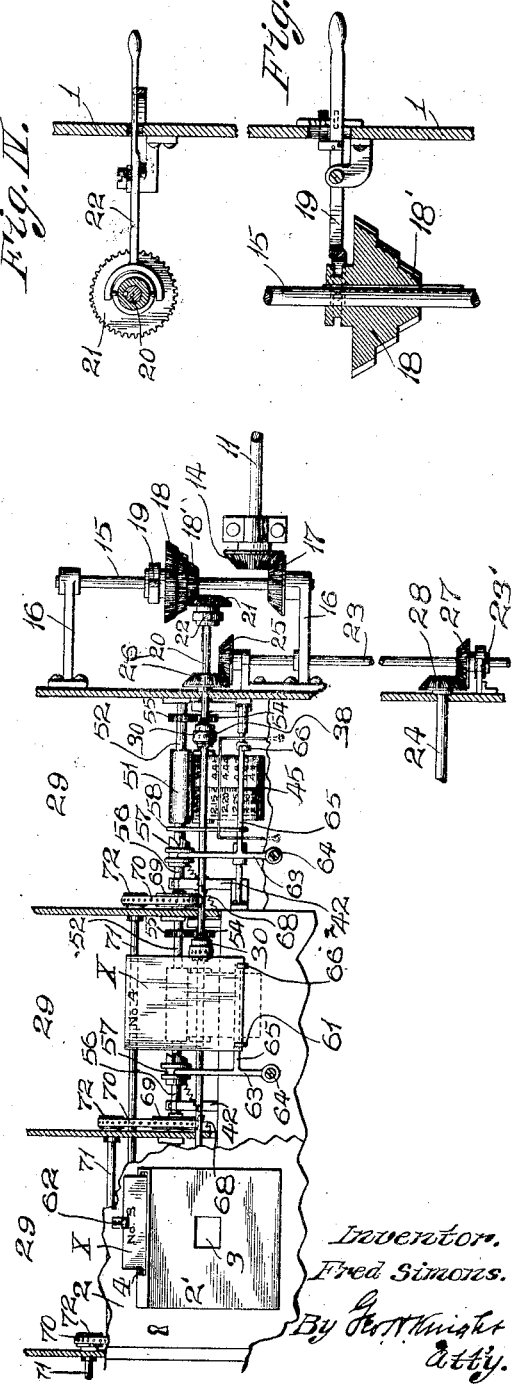
Inventor.
Fred Simons.
By Geo. N. Knight
Atty.

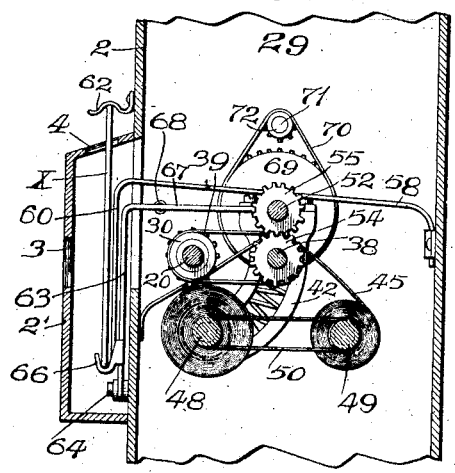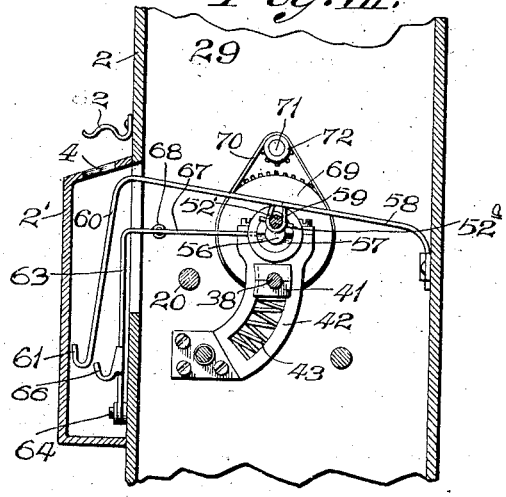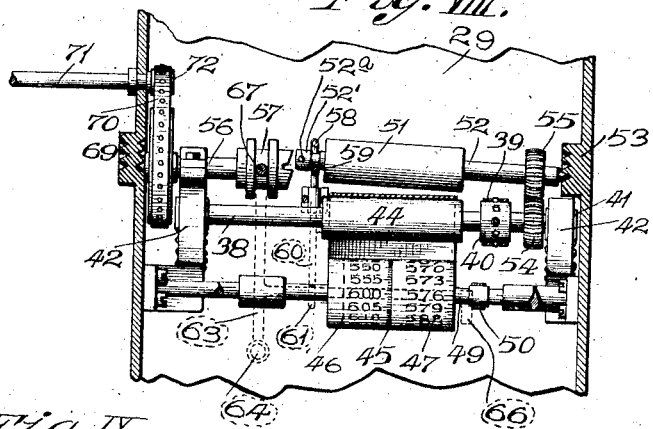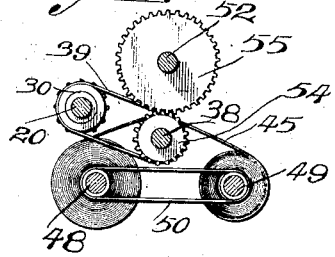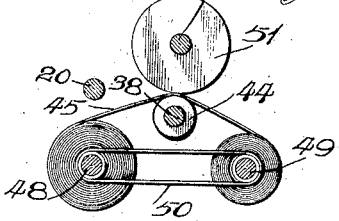

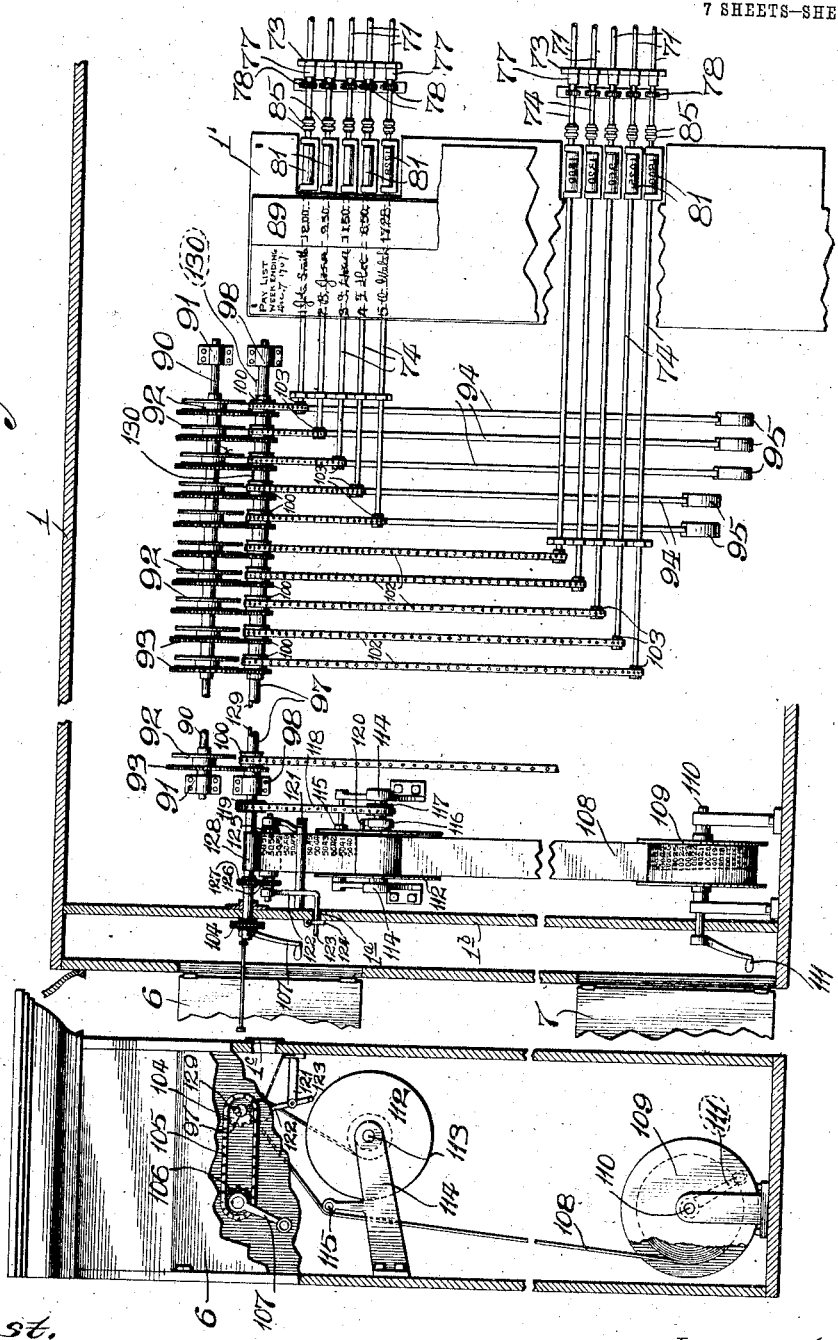

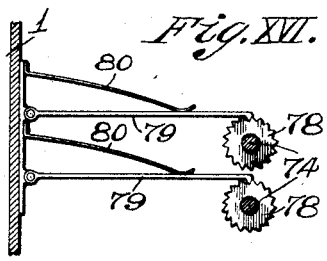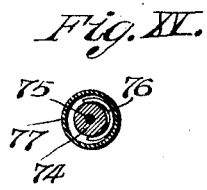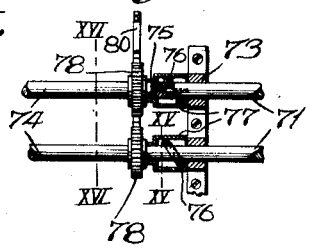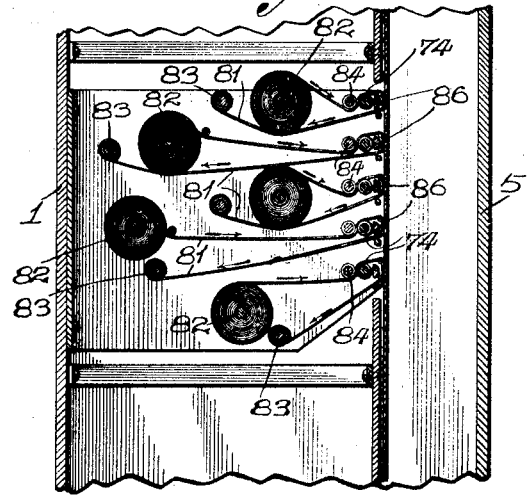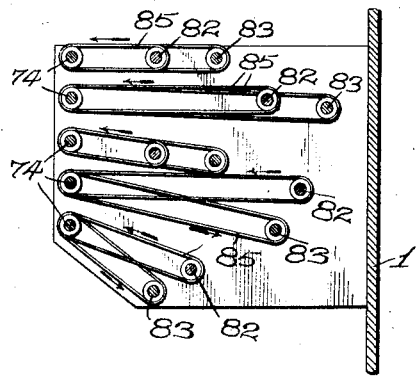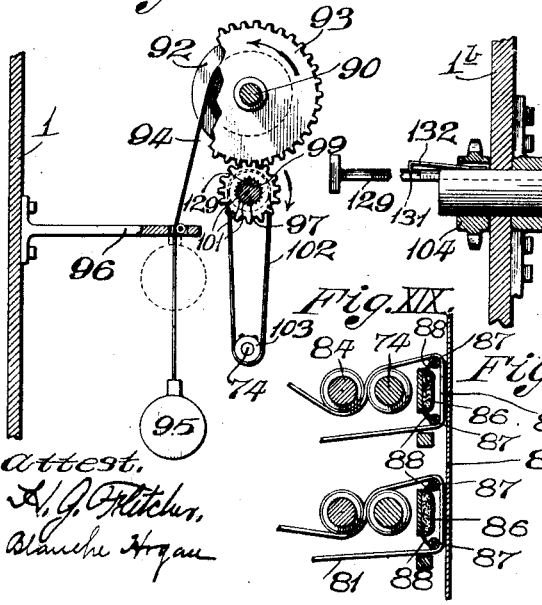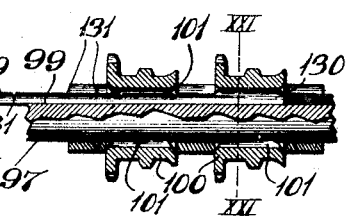

F. SIMONS.
WORKMAN'S TIME AND WAGE COMPUTING AND RECORDING APPARATUS.
APPLICATION FILED APR. 3, 1908.
975,296.
Patented Nov. 8, 1910.
7 SHEETS—SHEET 6.
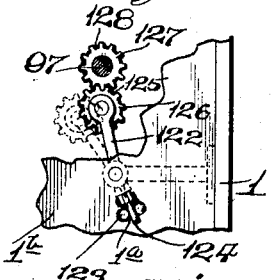
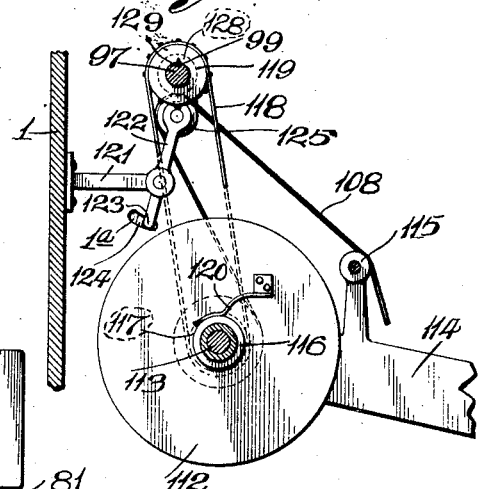
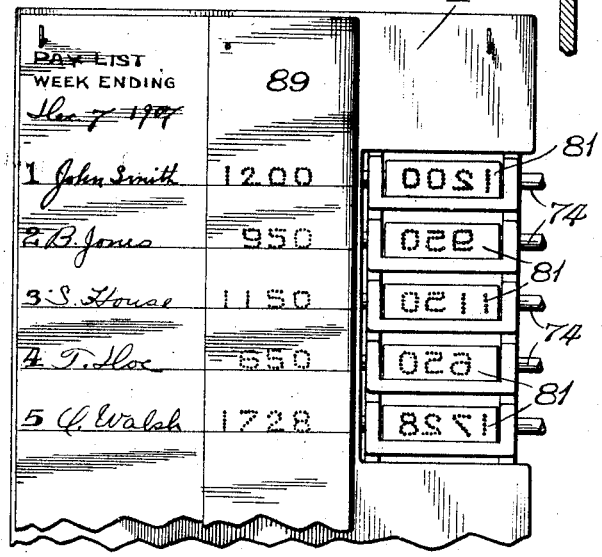
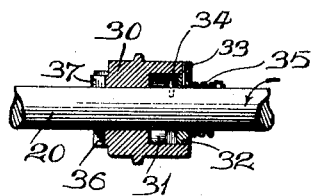
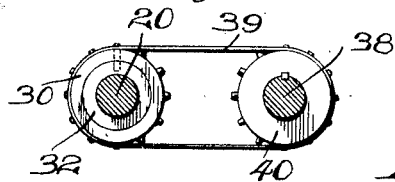
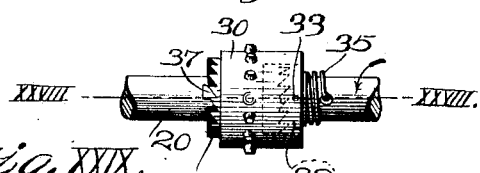
Attest:
H. J. Fletcher.
Blanche Hogan
Inventor.
Fred Simons.
By G. H. Knight
Atty.

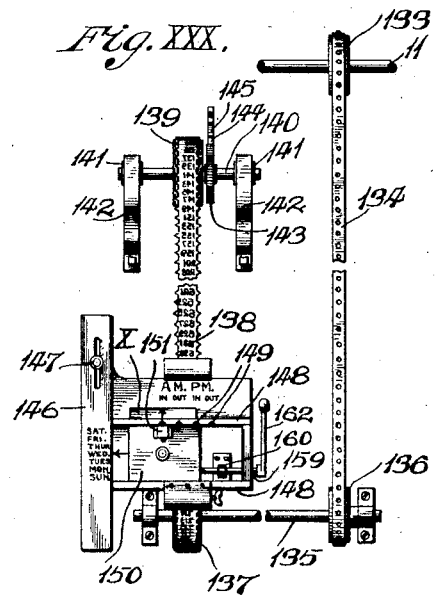

UNITED STATES PATENT OFFICE.

FREDERICK SIMONS, OF ST. LOUIS, MISSOURI.

WORKMAN'S TIME AND WAGE COMPUTING AND RECORDING APPARATUS.

975,296.  Specification of Letters Patent.  Patented Nov. 8, 1910.

Application filed April 3, 1908. Serial No. 424,904.

*To all whom it may concern:*

Be it known that I, FREDERICK SIMONS, a citizen of the United States of America, residing in the city of St. Louis and State of Missouri, have invented certain new and useful Improvements in Workmen's Time and Wage Computing and Recording Apparatus, of which the following is a full, clear, and exact description, reference being had to the accompanying drawings, forming part of this specification.

My invention relates to an apparatus for use in computing the time workmen are at work, and their wages, and for recording such time and wages by mechanical means operable through the medium of clock work that serves to furnish the power required for the various utilities in the apparatus.

The apparatus comprises means for computing and recording the actual time (hours and minutes) the workmen are at work during a given period; means for furnishing a correct record at any time of the amount of wages earned at any given rate; means for furnishing a complete and exact pay list at any required time; means for totaling a complete and exact pay roll at any time and for resetting the apparatus; and means for furnishing a record of the time of arrival and departure of the workmen for a single day or a series of days.

Figure I is a front elevation of the cabinet of my apparatus. Fig. II is in part a horizontal section through a portion of the casing of the apparatus and in part a top or plan view of the main driving mechanism and one of the workmen's individual computing mechanisms. Fig. III is a front elevation of a series of the workman's individual computing mechanisms and the power transmission members directly associated with said computing mechanisms. Fig. IV is a view partly in elevation and partly in vertical section of one of the main horizontal transmission power shafts and the shiftable transmission wheel on said shaft. Fig. V is a view in part an elevation and in part a vertical section of the main vertical transmission shaft and the shiftable transmission wheel on said shaft. Fig. VI is an enlarged view in part a vertical cross section and in part an end elevation of one of the individual computing mechanisms and the controlling devices associated therewith, the controlling devices being shown in the positions assumed when the workman's time card is in position to place said mechanism in operation. Fig. VII is a similar view to Fig. VI with the recording ribbon omitted and the controlling devices in the positions assumed when the workman's time card is absent from the controlling devices. Fig. VIII is an enlarged view partly in front elevation and partly in vertical section of the mechanism shown in Figs. VI and VII as it appears when the parts of said mechanism are not in operation. Fig. IX is an enlarged view partly in end elevation and partly in vertical cross section of the ribbon operating members of one of the individual computing mechanisms. Fig. X is a similar view to Fig. IX with the gear members shown in Fig. IX omitted. Fig. XI is a vertical section through one of the bearing box guides and spring supported bearing boxes therein, in which the pressure rollers of the workman's individual computing mechanisms operate. Fig. XII is an elevation of the pay list and pay roll and resetting mechanisms of the apparatus. Fig. XIII is an end elevation of the pay roll and resetting mechanism, with the casing of the apparatus shown partly in end elevation and partly in vertical cross section. Fig. XIV is an enlarged fragmentary view partly in elevation and partly in longitudinal section of two of the power transmission shafts leading to the pay list mechanisms and the yielding connection and detent devices associated with said shafts. Fig. XV is an enlarged cross section taken on line XV—XV, Fig. XIV. Fig. XVI is in part a vertical section taken on line XVI—XVI, Fig. XIV and in part an elevation of the transmission shaft detaining devices shown in Fig. XIV. Fig. XVII is a vertical cross section taken through the apparatus at the location of one set of the pay list devices. Fig. XVIII is an elevation showing the driving members by which the pay list members shown in Fig. XVII are connected. Fig. XIX is an enlarged vertical section illustrating the supports at the front of the series of pay list members shown in Fig. XVII and the members by which impressions upon a pay list sheet may be secured. Fig. XX is an enlarged fragmentary view partly in elevation and partly in section of the shaft that supports the driving members by which power is transmitted from the pay list operating mechanism to the pay roll mechanism, and the means by which said driving members are held from rotation upon said shaft when the mechanism is to be readjusted. Fig. XXI is a cross section taken on line XXI—XXI, Fig. XX. Fig. XXII is an enlarged view in part a vertical cross section and in part an elevation of the driving members by which power is communicated to the pay roll mechanism. Fig. XXIII is an enlarged front elevation of one set of the pay list devices, and one of the pay list sheets upon which an impression record is made from said devices. Fig. XXIV is an enlarged end elevation of the pay roll strip receiving spool and the pay roll strip feeding mechanism. Fig. XXV is an end elevation of the feed rolls of the pay roll strip operating mechanism and the means whereby the lower feed roll is movably supported. Fig. XXVI is an enlarged view in part a cross section and in part an elevation of main and counter shafts of one of the individual time and wage computing mechanisms, and the sprocket wheels mounted upon said shaft and geared to each other. Fig. XXVII is an enlarged elevation of one of the transmission shafts of one of the individual computing mechanisms and the sprocket wheel on said shaft. Fig. XXVIII is a longitudinal section on line XXVIII—XXVIII, Fig. XXVII. Fig. XXIX is a view partly in elevation and partly in longitudinal section of the members shown in Figs. XXVII and XXVIII with the sprocket wheel in inoperative position. Fig. XXX is a front elevation of the mechanism utilized to furnish records of the time of arrival and departure of workmen. Fig. XXXI is a side elevation of the mechanism shown in Fig. XXX. Fig. XXXII is an enlarged view partly in side elevation and partly in vertical section of the lower members of the mechanism shown in Figs. XXX and XXXI. Fig. XXXIII is a horizontal section taken on line XXXIII—XXXIII, Fig. XXXII. Fig. XXXIV is an elevation of one of the time cards utilizable in my apparatus.

In the accompanying drawings: 1 designates the cabinet within which the various mechanisms of my apparatus are arranged. At the front of said cabinet is a series of doors 2, see Fig. I, that are adapted to be held in a locked condition and which provide closures for a series of compartments in which the individual time and wage computing mechanisms of various workmen are contained. Each door 2 is of utility in connection with a particular workman, and, in order that the workman, may, if he so desires, ascertain at any time the number of hours that he has worked within a given period, I provide each door with a sight opening 3, through which the record within each particular workman's compartment may be viewed. Each door is further provided with a pocket 2' adapted to receive a workman's time card X, and a slot 4 through which the card is introduced into said pocket. 5 is a door located at the front of the cabinet 1 and which serves as a closure for a compartment in which the pay list devices of the entire number of workmen are contained.

6 and 7 are doors at one end of the cabinet, see Fig. XII, which serve as closures for a compartment in which the pay roll or totaling mechanism is contained. The doors 2, 5, 6 and 7 are intended to be opened to gain access to the compartments which they serve to close, by only some authorized person, such as, a time keeper or cashier, whose duty it is to take recording devices from the apparatus and replace them, adjust the parts of the apparatus and make such changes therein as may be necessary from time to time.

8 designates a clock mounted in the cabinet 1 and which may be of any ordinary construction. The minute hand shaft of the clock has fixed to it, within the cabinet 1, a miter wheel 9, see Fig. II, which meshes with a miter wheel 10.

11 is a sectional drive shaft to the prime section of which the miter wheel 10 is fixed, so that said section will constantly partake of the same movement as that partaken of by the minute hand of the clock and make one complete rotation in sixty minutes. The other section of the main drive shaft is adapted to be thrown into coöperation with the continuously operated prime section through the medium of a suitable clutch device, such as that shown in Fig. II, and which comprises a sleeve 12 feathered to one section of the shaft and a pin 13 in the other section adapted to be engaged by said sleeve. The clutch sleeve may be shifted into and out of position to connect the sections of the drive shaft by any suitable means when the mechanism of my apparatus is to be placed in operation at the beginning of a day's work and be again shifted to disconnect the drive shaft sections and place the mechanism of the apparatus out of operation at the end of a day's work. Upon the secondary drive shaft section is a miter wheel 14.

15 is a vertical main transmission shaft journaled in suitable brackets 16 within the cabinet and which has fixed to it a miter wheel 17 that meshes with the miter wheel 14.

18 is a stepped bevel transmission wheel feathered to the vertical shaft 15 and which is adapted to be adjusted upon said shaft by a suitable shift lever 19.

20 is a horizontal transmission shaft that extends through one set or row of the compartments in which the individual time and wage computing mechanisms are located, as will hereinafter more fully appear.

21 is a bevel gear wheel feathered to the transmission shaft 20 and adapted to be shifted upon said shaft by a suitable shift lever 22. The bevel wheel 21 is adapted to be placed either in mesh with a miter gear 18' of the bevel gear wheel 18 or with either of a series of bevel gears arranged in stepped relation to said miter gear. When the bevel wheel 21 is in mesh with the miter gear 18' and the vertical transmission shaft 15 is being driven by the drive shaft 11, a single rotation is imparted to the shaft 20 in a period of sixty minutes, whereas, when said wheel 21 is in mesh with either of the other gears of the wheel 18 a differentiated degree of rotation is imparted to the transmission shaft 20. This is important in that the miter gear 18' provides for the operation of the time and wage computing mechanisms at "straight" time for day-work, and the other gears provide for such operation at "time and a half" for night work and "double time" for work on holidays.

23 is a supplemental vertical transmission shaft by which power is transmitted from the horizontal transmission shaft 20 to a series of supplemental horizontal transmission shafts 24 which occupy positions in compartments containing workmen's individual computing mechanisms located beneath the compartments through which the shaft 20 extends. The supplemental transmission shaft 23 has motion imparted to it similar to that imparted to the shaft 20 through the medium of a miter wheel 25 fixed to the shaft 23 and a miter wheel 26 fixed to the shaft 20, see Fig. III. Motion is communicated from the shaft 23 to the supplemental transmission shafts 24 by miter wheels 27 fixed to the shaft 23 and miter wheels 28 fixed to the shafts 24.

29 designates the compartments in which the individual time and wage computing mechanisms are located. In each of these compartments is an independent mechanism that is operable by either the horizontal transmission shaft 20 or a supplemental horizontal transmission shaft 24 according to the position of the compartments relative to the main driving mechanism which has been described. In each compartment 29 and upon the horizontal transmission shaft therein is a driving sprocket wheel 30 from which power is communicated to the time and wage computing mechanism of the compartment, the said sprocket wheels being loosely mounted upon the shafts to which they apply, as seen in Figs. XXVIII and XXIX. Each sprocket wheel 30 is provided with a chamber 31 and a toothed clutch ring 32 which is located at one end of the wheel and is held in a fixed position within the wheel by suitable means, such as a pin 33, see Fig. XXVIII. The teeth of the clutch ring 32 are located at the interior of the sprocket wheel so that they face the chamber 31 therein, and they are adapted to engage clutch pins 34 set in the shaft to which the sprocket wheel is applied and to which pins the ring 32 is normally held by a pressure spring 35 attached to the shaft. When either of the transmission shafts 20 or 24 are in operation for the transmission of power to the individual computing mechanism, the shaft is turned in the direction indicated by the arrows, Figs. XXVII and XXVIII, while the clutch pins 34 are in positions in front of teeth of the tooth clutch ring 32. At this time the shafts serve to drive the sprocket wheels 30 with them during the rotations of the shafts in the proper directions to transmit motion to the individual computing mechanisms. Each sprocket wheel 30 is provided at its end opposite to that containing the toothed ring 32 with cam teeth 36 that extend in a circle around the shaft on which the sprocket wheel is mounted and which are arranged reversely relative to the teeth of the clutch ring 32.

37 are cam teeth carried by the shafts 20 and 24 and which are adapted to be engaged by the cam teeth 36, as seen in Figs. XXVII and XXVIII. The cam teeth 36 of each sprocket wheel 30 are in engagement with the opposing cam tooth 37 under normal conditions in the operation of my apparatus, and while the toothed clutch ring 32 of each sprocket wheel is in engagement with the clutch pin 34 of the corresponding shaft, but at this time the cam teeth do not perform any service. They are of a particular service that will be hereinafter pointed out.

*The individual time and wage computing mechanisms.*—These mechanisms, as before mentioned, are operable through the medium of the horizontal transmission shafts 20 and 24, and the driving sprocket wheels 30 thereon are all of like construction. I will therefore describe in detail only one of such mechanisms.

38 is a counter-shaft that is rendered cooperable with the corresponding sprocket wheel 30 through the medium of a driving belt 39 applied to the sprocket wheel 30 and to a sprocket wheel 40 upon said counter-shaft. The counter-shaft 38 is supported for vertical movement in journal boxes 41 that are slidably positioned in brackets 42, see Figs. VI, VII, VIII and XI, the journal boxes being yieldably upheld by supporting springs 43. Upon the counter-shaft 38 is a feed roller 44, see Figs. VII, VIII and X.

45 is a computing ribbon that is adapted to travel upon the feed roller 44 and which is fed by means to be presently explained. This computing ribbon is sub-divided into two divisions 46 and 47 extending longitudinally thereof. The division 46 has printed notations therein indicating hours and fractional parts of hours, (minutes). The notations mentioned are continued throughout the length of the ribbon and they may be such as to cover the working hours of a single day or the working hours of a series of working days—for instance, those of a week. The fractional parts of the hours indicated may be any desired fraction, such as, for illustration that shown in the drawings, Figs. II, III and VIII, where I have shown fractions of five minute intervals. For example, the computing ribbon, as seen in Fig. VIII as exposed to view thereon: fifteen hours and fifty minutes; fifteen hours and fifty-five minutes; sixteen hours and no minutes; sixteen hours and five minutes.

The division 47 of the computing ribbon contains parallel with the notations of hours and fractions of hours in the division 46 notations of wages in dollars and cents that are earnable by a workman at a given rate of pay per hour. The notations of pay progress in the division 47 in conformity with the progression of the notations of hours and fractions of hours in the division 46 so that the pay for any number of hours and fractions of hours is shown opposite the notations of the period of time, whereby both the time and wages of a workman may be computed simultaneously.

It is to be here noted that I utilize differently prepared computing ribbons 45 for workmen receiving different rates of pay and that the notations of wages in the divisions 47 of these ribbons differ in order that the amount of wages may progress more rapidly in one ribbon than in another for the same periods of time. For illustration— If one workman receives pay at the rate of ten cents an hour the notations of wages in dollars and cents in the division 47 of the computing ribbon used for this workman would be properly spaced according to the notations of time, hours and fractional parts of hours in the opposite division of the ribbon. For a workman receiving pay at the rate of twenty cents per hour the notations of wages in the ribbon used would be more closely assembled in the division 47 of the ribbon and consequently the amount of wages shown in the ribbon during its operation in the apparatus will increase much more rapidly than the first mentioned ribbon to compute the wages of the second mentioned workman as correctly as they are computed by the first mentioned workman.

One end of the computing ribbon 45 is attached to a dispensing spool 48 and the other end of the ribbon is attached to a receiving spool 49. In order that the receiving spool may be caused to take up the ribbon as it is delivered from the dispensing spool, by feed mechanism to be described, I provide a belt 50 that is operable upon said spools. This belt engages the spools by frictional contact only and therefore it may slip upon either spool when occasion demands, as is necessary, due to the variations in the diameters of the rolls of ribbon produced upon the spools 48 and 49 at different times.

During the unwinding of the computing ribbon from the dispensing spool and while the amount of ribbon upon the dispensing spool is greater than that upon the receiving spool, the computing ribbon is fed to the receiving spool and becomes wrapped loosely therearound until such time as the amount of ribbon upon the receiving spool becomes greater than that upon the dispensing spool when the conditions will be such that the receiving spool will take up more ribbon than that dispensed by the dispensing spool and as a result, the computing ribbon is tightened around the receiving spool. The computing ribbon in its passage from the dispensing spool 48 to the receiving spool 49 extends over the pressure roller 44 upon the counter-shaft 38, as seen in Figs. VI to X inclusive.

51 designates a pressure roller adapted to be mounted above the feed roller 44 carried by the counter-shaft 38 and by which the computing ribbon 45 is fed when the time and wage computing mechanism is in operation. The pressure roller 51 is interchangeably mounted in the computing mechanism in order that it may be readily replaced by another roller, inasmuch as the roller used varies in diameter according to conditions to be hereinafter noted. The pressure roller 51 has spindles 52, 52', the former of which is adapted to seat in one of a series of sockets 53 in an end wall of the compartment in which the particular individual computing mechanism is located. Motion is transmitted from the counter-shaft 38 that carries the feed roller 44 to the pressure roller spindle 52 through the medium of spur wheels 54 and 55. The pressure roller 51 is designed to remain separated from the computing ribbon 45, see Fig. VIII, when any individual computing mechanism is not in operation, thereby preventing actuation of the computing ribbon at such time, and it is moved to the ribbon to establish feeding action by means to be presently described.

56 is a shaft into alinement with which the pressure roller 51 is adapted to be moved. Feathered to the shaft 56 is a clutch sleeve 57 that is adapted to be moved into engagement with the pressure roller spindle 52', and which is provided with a pin 52$^a$ adapted to be engaged by said clutch sleeve 57.

The pressure roller 51 and the clutch sleeve 57 are adapted to be moved into active positions by means which are actuated upon by the workmen's time cards X when said cards are introduced into the pockets 2' of the doors 2 at the front of the compartments 29. These card actuated means will next be described.

58 is a spring arm secured to the rear wall of each compartment 29 and extending forwardly from said wall and over the stub shaft 52' of the pressure roll 51. This spring arm is provided with a loop or socket 59, see Figs. VII and VIII, in which the pressure roller spindle 52' rests and by which the pressure roller 51 is sustained in an uplifted position out of contact with the computing ribbon 45 when the workmen's time card is absent from the pocket 2'. The spring arm 58 extends into the pocket 2' and is provided with a leg 60 which terminates at its lower end in a hook 61 adapted to receive the workmen's time card when it is introduced into said pocket. The workmen, upon introducing the time card into the pocket, exerts downward pressure thereupon and as a consequence the spring arm 58 is depressed until the card may be slipped beneath a keeper 62 located above the pocket 2', at which time the pressure roller 51 has been lowered into contact with the computing ribbon 45 and into alinement with the shaft 56.

63 is a clutch sleeve operating arm that is vertically positioned in the pocket 2' and pivoted to the rear wall of said pocket at 64, see Figs. III, VI and VII. This arm is provided with a horizontal member 65 which extends laterally in the pocket 2' in front of the computing ribbon 45, and which is provided at its extremity with a hook 66 adapted to receive the workmen's time card when said card is introduced into the pocket and into engagement with the hook of the pressure roller controlling spring arm 58. The clutch sleeve operating arm 63 is provided with an extension 67 that is loosely fitted to the clutch sleeve 57 and to which is connected a pull spring 68. The pull spring just mentioned serves, when the workmen's time card is absent from the pocket 2', to draw the extension 67 laterally, thus causing the arm 63 to be swung upon its pivot 64, and during the time that the workmen's time card is absent from the pocket the clutch sleeve 57 is retained in the retracted position shown in Fig. VIII under the influence of said spring. When, however, the workmen's time card is introduced into the pocket 2' it acts first by pressure upon the hook 61 of the spring arm 58 to lower said spring arm and cause the pressure roller 51 to be lowered into contact with the computing ribbon 45 and its spindle 52' to be in position to receive the clutch sleeve 57. Then, as the downward movement of the time card is continued said card acts by pressure upon the hook 66 of the clutch sleeve operating arm 63, thereby lowering said hook from the position illustrated in Fig. VII to the position seen in Fig. VI, the movement of the card being sufficient to permit of the upper edge of the card being passed beneath the keeper 62. During such movement of the arm 63 the clutch sleeve is carried forwardly to embrace the spindle 52' of the pressure roller 51 and provide for coöperation of the shaft 56 with the pressure roller. When the described actions by the introduction of the time card have been accomplished the pressure roller 51 is placed in such contact with the computing ribbon 45 as to cause said ribbon to be fed by the combined operation of said pressure roller and the feed roller 44. The feeding action of the computing ribbon will then take place in the proper manner to compute the time and wages of the workmen whose time card has been introduced into the workmen's individual time card receiving pocket 2'.

I now come to the transfer mechanism leading to the pay list mechanism of my apparatus. This mechanism is operable through the medium of the shafts 56 operated by the pressure rollers 51 of the individual time and wage computing mechanisms and to this end each shaft 56 is provided with a drive wheel 69 that receives a belt 70, see Figs. II, III and VI to VIII inclusive. 71 are transfer shafts extending from the compartments 29 containing the individual time and wage computing mechanisms to the compartment containing the pay list mechanism and which is located back of the door 5 of the cabinet 1. These transfer shafts have fixed to them within the compartments 29 belt wheels 72 upon which the belts 70 operate to transmit power from the shafts 56 to the shafts 71. The transfer shafts 71, operable in the various rows of compartments 29, are in part supported by the walls of said compartments and adjacent to the compartment in which the pay list mechanism is contained are journal brackets 73, see Figs. XII and XIV, in which said shafts are journaled.

74 designates feed shafts that are intermittently operated by the transfer shafts 71 and which serve as direct driving members for the pay list mechanisms. These shafts receive alining pins 75 mounted in either the shafts 71 or 74 and said shafts are united by volute springs 76 each of which is connected at one end to one of the transfer shafts 71 and at the other end to the feed shaft 74 in alinement therewith, as seen in Fig. XIV. The joining ends of the shafts 71 and 74 are inclosed within cylindrical housings 77 carried by one of the shafts, said housings being shown in the drawings as applied to the feed shafts 74 and being extended to a sufficient distance around the shaft 71 to entirely inclose the volute springs 76. In order that a certain degree of resistance to the rotation of the feed shafts may be offered to restrain them from constant rotation with the shafts 71 and cause them to partake of a step by step movement, I provide the following restraining means. The restraining means consist of toothed wheels 78 fixed to the feed shafts, detent arms 79 suitably supported by attachment to the cabinet 1 and the free ends of points of which are adapted to be yieldingly held between teeth of the wheels 78 by springs 80.

*The pay list mechanism.*—This mechanism, which is illustrated in Figs. XII, XVII, XVIII, XIX and XXIII, will next be described.

81 are wage indicating tapes which are companionable with the various time and wage computing mechanisms in the compartments 29 and each of which is secured at one end to a dispensing spool 82 and at the other end to a receiving spool 83, see Fig. XVII. These tapes have produced thereupon in a manner suitable to permit of impressions being made therefrom, designations of earnings—graded cent by cent—see Fig. XXIII. The tapes 81 are operated through the medium of the pressure rollers 51 of the individual time and wage computing mechanisms hereinbefore described, and are caused to so travel that the designations thereon, which appear at the front of the pay list mechanism, will always correspond to the wages indicated in the individual time and wage computing mechanisms. The tapes 81 in being unwound from the dispensing spools 82 and wound upon the receiving spools 83, pass between the feed shafts 74, which are preferably suitably covered at the points where they receive contact of the tapes, and pressure rollers 84 by which members of the tapes are fed. It is as well to here note the importance of causing the tape feed members; namely, the feed shafts 74 and the pressure rollers 84, to operate in a manner to always so impart travel to the tapes 81 that the wage indications thereon will appear singly at the front of the pay list mechanism, and it is for this reason that the feed shafts 74 are operated intermittently by the transfer shafts 71 that convey power thereto. In this connection it will be seen, by referring to Fig. XV, that the volute spring 76, which is there shown in a position of rest, is bowed slightly from the shafts 71 and 74 to which its ends are connected. Now, as the shafts 71 are operated by power communicated thereto by the pressure rollers 51 of the individual time and wage computing mechanisms said shafts act to exert pulling strains upon the volute springs, but inasmuch as the feed shafts 74 are yieldingly restrained by the toothed wheels 78 and the detent arms 79, said volute springs are gradually drawn to the shafts 71 and 74 until all of the slack present therein is eliminated, thereby causing the spring to exert a positive and unyielding action upon the feed shaft 74 so that the restraint offered by the detent arm 79 corresponding to said shaft is overcome and the feed shaft is rotated quickly and positively to a certain degree to operate the corresponding tape 81 so that the next succeeding wage indication thereon will be brought to view at the front of the pay list mechanism.

I have hereinbefore mentioned that the pressure rollers 51 of the individual time and wage computing mechanisms are interchangeably mounted in said mechanisms and that the rollers used are of various diameters. These rollers are made of various diameters to provide for the operation of the various pay list mechanisms at different speeds, the diameters of the rollers being proportioned according to the rates of wages paid per hour to different workmen. It is obvious that where the pressure rollers 51 vary from each other the spur wheels 55 carried thereby also vary to provide for the difference in operation of the rollers by power communicated thereto in the individual wage computing mechanisms. To illustrate the operation of the pay list mechanisms by the interchangeable pressure rollers it will be assumed for example that one workman receives ten cents per hour for his labor and that another workman receives for his labor twenty cents per hour. For the first workman I utilize a pressure roller 51 to properly operate the pay list mechanism to which this roller corresponds according to the rate of pay per hour while for the other workman I utilize a pressure roller of a sufficiently less diameter than the first roller so that this last pressure roller will act to drive the pay list mechanism at a greater speed than the first mentioned roller and the notations of wages in the pay list mechanism will be properly and proportionately greater over those for the first mentioned workman.

To provide for the delivery and receiving spools 82 and 83 being properly operated to pay off and take up the tapes 81, I utilize belts 85, see Fig. XVIII, that, being loosely mounted upon the feed shafts 74 and the spindles of the spools 82 and 83, serve to communicate power from the feed shaft to said spools in a manner to permit slippage of the belts when necessary, due to the variations in the diameters of the rolls of tape occurring at different times upon the spools.

At the front pay list mechanism are ink pads 86, as most clearly seen in Fig. XIX, located immediately back of the tapes which are normally held separated from the ink pads by rollers 87 carried by spring arms 88. To illustrate the utility of the tapes 81 in the production of the pay list I have shown at 89 a pay list sheet attached to a fixed portion 1' of the cabinet 1, see Fig. XXIII. This pay list may have written or printed thereon the names of the workmen for whom computations of wages are made and the sheet is adapted to be positioned so that blank spaces thereon will be opposite to the names of the workmen which are in proper relation to the various tapes 81. When an impression to denote the wages due the particular workmen is to be made upon the pay list sheet 89 said sheet is moved from the position shown in Fig. XXIII to a position in front of the exposed portions of the tapes 81 upon which designations of wages due the workmen appear, and a roller or other suitable instrument is pressed along the back of the pay list sheet with the result of forcing the rollers 88 rearwardly and the tapes into contact with the ink pads 86 so that ink from said pads may be transferred through the perforations in the tapes 81 and onto the pay list sheet. The pay list sheet as shown in Fig. XXIII, is in the condition in which it appears after the impressions just referred to have been carried out.

*The pay roll and resetting mechanism.*— This mechanism is shown in Figs. XII, XIII, XX, XXI, XXII, XXIV and XXV.

90 is a bearer shaft that is mounted in suitable brackets or boxes 91, see Fig. XII. 92 are drums loosely mounted upon the bearer shaft 90 and provided with gear wheels 93 that are engaged by members to be hereinafter more particularly mentioned for the operation of the drums. The drums 92 correspond in number to the number of individual workman's time and wage computing mechanisms and each drum has secured to it a tape 94, see Figs. XII and XXII, to the free end of which is attached a weight 95. The tapes 94 operate through stop bars 96 that also serve as guides for the tapes and to which the weights 93 are adapted to be elevated when the tapes are wound upon the drums 92 by means to be hereinafter described.

97 designates a winding shaft that is mounted in suitable bearing boxes 98 and extends parallel with the drum-supporting bearer shaft 90. This winding shaft is provided with a longitudinal groove 99, see Figs. XX to XXII inclusive.

100 are controlling wheels loosely mounted upon the winding shaft 97 and each of which is provided internally with a plurality of grooves 101 adapted to receive a member to be hereinafter more particularly referred to. The controlling wheels 100 are arranged in mesh with the gears 93 of the drums 92 and power is transmitted to said controlling wheels by belts 102 that lead from driving wheels 103 fixed to the feed shafts 74 at points beyond the pay l'st mechanism, as seen in Fig. XII. The winding shaft 97 extends to an end of the cabinet 1 and at its outer termination has fixed to it a driven wheel 104 that receives a drive chain 105 which is also mounted upon a drive wheel 106 that is arranged to be operated by a crank 107, thereby providing for the rotation of the winding shaft 97 for a purpose to be hereinafter pointed out.

108 designates a pay roll ribbon upon which are characters indicating dollars and cents ranging as high as may be necessary to include the complete pay roll of the user of my apparatus, the designations upon the ribbon being graded cent by cent, as seen in Fig. XII. The pay roll ribbon is attached at one end to a dispensing spool 109 having a shaft 110 that is adapted to be operated by a crank handle 111 when the ribbon is to be rewound upon the dispensing spool. 112 is a receiving spool to which the other end of the pay roll ribbon is attached. The receiving spool is loosely mounted upon a shaft 113 that is mounted in brackets 114, see Figs. XII, XIII and XXIV and which serve also as a support for a guide roller 115 that serves to direct the travel of the pay roll ribbon. The receiving spool shaft 113 has fixed to it a collar 116 and also a belt wheel 117 that is adapted to be operated by a belt 118 fitted to said wheel and to a belt wheel 119 fixed to the winding shaft 97. The belt 118 acts to drive the shaft 113 when the winding shaft is rotated, and to provide for the winding spool 112 being driven by its supporting shaft, I secure to said spool a spring friction arm 120, see Fig. XXIV, that rests against the collar 116. It will be seen when the shaft 113 and the collar 116 are rotated said collar will act by frictional contact with the arm 120 to drive the receiving spool in a manner to take up the pay roll ribbon as it is delivered thereto by feeding means to be described, and without any strain upon the ribbon, due to increasing size of the roll of ribbon as it is taken up by the spool. The pay roll ribbon 108 is adapted to be withdrawn from the dispensing spool 109 and delivered to the receiving spool 112 by feeding members operated through the medium of the winding shaft 97 and which will now be set forth.

121 is a bracket arm secured to a wall of the cabinet 1 beneath the winding shaft 97 and above the receiving spool 112.

122 is a double armed rocker loosely mounted upon the bracket arm 121 and provided with a handle arm 123 that is adapted to protrude through a slot 1ª in a partition 1ᵇ of the cabinet 1, see Figs. XII, XXIV and XXV, and to be held in a set position in said slot by a movable keeper or stop 124.

125 is a pressure roller having its shaft journaled in the arms of the rocker 122 and which is located immediately beneath the winding shaft 97. Upon the shaft of this pressure roller is a spur wheel 126 that meshes with a spur wheel 127 fixed to the winding shaft. 128 is a feed roller carried by the winding shaft. This feed roller is located immediately above the pressure roller 125 and the pay roll ribbon passes between said feed roller and pressure roller so that when the winding shaft is operated the pay roll ribbon will be gradually drawn from the dispensing spool 109 in order that the characters upon the ribbon may be viewed through a sight opening 1ᵉ in the cabinet 1, see Figs. I and XIII.

It has been hereinbefore stated that the winding shaft 97 is provided with a longitudinal groove 99. This groove receives a key rod 129, see Figs. XII, XIII and XX to XXII inclusive, which is slidably fitted in the groove and which, throughout the main portion of its length, is of such width that it does not extend beyond the periphery of the winding shaft. There is, however, at the inner end of the key rod a key 130, see Figs. XX and XXI, that is adapted to enter into the grooves in the various controlling wheels 100 upon the winding shaft for the purpose of locking them to the shaft in order that when the shaft is rotated each wheel may be turned individually therewith for a purpose that will be presently made plain. The key rod 129 is provided at intervals with notches 131 spaced apart according to the width of the controlling wheels 100 and which are adapted to receive a detent 132, see Fig. XX, that is carried by the winding shaft and through the medium of which the key rod is held from movement when its key 130 is in engagement with any particular controlling wheel.

In the practical use of my apparatus, the pay roll and resetting mechanism is previous to the apparatus being placed in operation, so adjusted that the pay roll ribbon is wound in the main upon the dispensing spool 109 and the lowest denomination of characters on the ribbon are in proximity to the feed roller 128 and the pressure roller 125 between which the ribbons is to be fed. The mechanism is also so adjusted that the tapes 94 are wound upon the drums 92 so that they are in contact with the stop bars 96, as seen in dotted lines, Fig. XXII. Now, when the various workman's time and wage computing mechanisms are in operation, said mechanisms act to operate the transfer shafts 71 and the feed shafts 74 in a manner hereinbefore fully set forth, and as a consequence, the various belts 102 corresponding to the individual computing mechanisms that are in operation transmit motion to the controlling wheels 100 according to the degree of motion of the shaft 71 and 74, and said controlling wheels in turn transmit the motion to the drums 92 so that the tapes thereon are dispensed from the drums to a degree corresponding to that permissible by the operation of the time and wage computing mechanisms, and are drawn downwardly by the weights 95, as illustrated in Figs. XII and XXII.

When, at the end of any specified period, such, for instance, as a week, it is desired to secure, by the use of the pay roll mechanism, indication of the entire pay roll and also to reset the apparatus, the following operation is carried out. The key rod is shifted in the winding shaft 97 until its key portion is placed in engagement with one of the controlling wheels 100 and said winding shaft is then rotated through the medium of the crank 107 and the gearing associated with it. As the winding shaft is rotated the key of the key rod acts to cause the controlling wheel it engages to be carried with the winding shaft, whereby the controlling wheel in turn is caused to impart rotation to its companion drum 92, the operation of the drum being continued until the tape 94 is fully wound, or in other words, strikes the corresponding stop arm 96. The key rod 129 is then shifted to move the key 130 to another controlling wheel corresponding to a drum 92 from which a tape 94 has been dispensed and this operation is continued until all of the tapes have been rewound. During the operation of the winding shaft for the purpose of rewinding the tapes 94, said shaft is rotated as each tape is rewound according to the degree of tape that has been dispensed from each particular drum 92 and the feed roller 128 is rotated with said winding shaft. As a consequence, said feed roller is caused to operate in conjunction with the pressure roller 125 during each tape winding operation to a degree that will cause the pay roll ribbon 108 to be fed between said rollers according to the computations of wages performed by the various individual time and wage computing mechanisms of the apparatus, each computation being thus in turn added to the one preceding it upon the pay roll ribbon.

During the operation of the winding shaft for the actuation of the pay roll ribbon the parts of the apparatus leading to the pay roll and resetting mechanism are reset by imparting backward rotation to such parts. This resetting is accomplished by the controlling wheels 100 each acting in its turn to drive the corresponding belt 102 reversely relative to its original movement so that it will impart rotation in reverse direction to the corresponding feed shaft 74. Said feed shaft then acts to rotate the transfer shaft 71 companionable with it, and the shaft 71 in turn acts to operate the individual time and wage computing mechanism with which it is associated with the result of returning the computing ribbon 45 of such mechanism to its original starting point. It is in this resetting action that the cam teeth 36 and 37 of the clutches upon the transmission shafts 20 and 24 of the individual time and wage computing mechanisms are brought into action. As the counter-shaft 38 of each individual computing mechanism is rotated reversely in resetting mechanism, the driving belt 39 which operates in conjunction with said counter-shaft has movement imparted to it but said belt is prevented from acting to drive the corresponding transmission shaft 20 or 24 through the medium of the sprocket wheel 30 thereon. This is due to the cam teeth 36 of said sprocket wheel coöperating with the cam teeth 37 upon the transmission shaft in a manner to shift the sprocket wheel laterally upon the shaft against the action of the pressure springs 35 with the result of keeping the teeth of the clutch rings 32 out of engagement with the clutch pins 34 of the transmission shafts. The objects in obviating the impartation of rotation to the transmission shafts 20 and 24 is to avoid the necessity of imparting rotation to the main power members of the apparatus during the resetting operation, inasmuch as actuation of these parts at such time would be of no benefit. In order that the main power members may not be operated during the resetting of the other mechanisms, I associate with some one of the power shafts, a ratchet and pawl device. Such a device is shown at 23' associated with the transmission shaft 23, (see Fig. III.)

*The time registering mechanism.*—This mechanism is illustrated in Figs. XXX to XXXIII inclusive and it is in constant operation, due to its being associated with the prime section of the main drive shaft 11 that is operated directly by the minute hand of the clock used in the apparatus.

133 is a drive wheel fixed to the prime section of the main drive shaft 11, and 134 is a belt operable upon said wheel.

135 is a counter-shaft upon which is a belt wheel 136 that receives the belt 134 to provide for the operation of said counter-shaft. The counter-shaft has fixed to it a driving wheel 137.

138 is an endless time ribbon containing designations of time counted by minutes and hours. The designations upon the time ribbon are preferably numerals or designations so produced upon the ribbon that impressions may be secured therefrom and the time ribbon operates upon the drive wheel 137 and also upon an idler wheel 139 fixed to a supporting shaft 140 that is journaled in boxes 141 spring supported in brackets 142. In order that the time ribbon may have a step by step movement imparted to it so that it will remain at rest each interval of one minute, I provide retarding means for the supporting shaft of the wheel 139, which means comprises a toothed wheel 143 fixed to said shaft, a pawl 144 pivotally mounted adjacent to and adapted to engage said wheel, and a spring 145 by which the pawl is held to the wheel. The pawl by its engagement with the wheel, acts to restrain the shaft 140 from rotation until sufficient pressure has been exerted by the toothed wheel 143 against the pawl to overcome its controlling spring, and the shaft 140 is then permitted to partake of a sudden movement sufficient to carry the time ribbon a distance corresponding to the distance between two adjoining time designations on the ribbon.

146 is a time card receiving frame adjustably positioned in front of the time ribbon 138 and back of which the time ribbon is adapted to move in such manner that the designations of time thereon back of the frame constantly correspond to the time, as indicated by the clock used in the apparatus. The frame 146 bears indications disposed in a vertical column of the days of the week, as seen in Fig. XXX and it is adapted to be adjusted vertically and upheld in any adjusted position by suitable means, such as a retaining button 147 that passes through the frame and is seated in the cabinet of the apparatus. The portion of the frame which is in front of the time ribbon has "A. M." and "P. M." designations thereon and "In" and "Out" designations beneath the "A. M." and "P. M." designations. This portion of the frame is also provided with a pair of guides 148, one of which is provided with notches 149.

150 is a card receiving slide that is positioned between the guides 148 and equipped with a suitable latch 151 that is adapted to engage the notched guide 148.

152 is an ink ribbon or other suitable device that is arranged in front of the time ribbon 138 and back of the card receiving frame 146, and is attached to spools 153.

154 is a platen located back of the card receiving slide 150 and the stem 155 of which is loosely mounted in a bracket arm 156 conveniently attached to the cabinet. The platen and its stem are normally yieldingly held in a retracted position by a retracting spring 157, see Fig. XXXIII, and the stem has projecting from it, and through the bracket arm, a pin 158.

159 is a throw rod rockably mounted in a bracket arm 160 and provided with a crank arm 161 that engages the pin 158. The throw rod 159 also has fixed to it a hand lever 162 by which it may be rotated to impart forward movement to the platen 154.

In the practical use of the time registering mechanism, the workmen's time receiving card frame 146 is adjusted vertically to properly position it according to each day of the week during the use of the apparatus. Each workman, in registering the time of his arrival and departure, either in the morning or afternoon, inserts his time card X into the card receiving slide 150 and shifts said slide, if necessary, so that the "In" and "Out" columns upon the card for either "A. M." or "P. M." will be in proper position to receive an impression from the time ribbon 138. The workman has then only to operate the hand lever 162 and the platen 154 is moved forwardly to exert pressure against the time ribbon and carry it toward the time card with the ink ribbon 152 interposed between the time ribbon and time card. In doing this, the workman makes an exact impression of the time of his arrival or departure upon his time card.

Claims:

1. In an apparatus of the character described, a time controlled power mechanism, a series of individual wage computing mechanisms coöperable with said power mechanism, and pay list mechanisms separate from said computing mechanisms and coöperable therewith, substantially as set forth.

2. In an apparatus of the character described, a time controlled power mechanism, a series of individual wage computing mechanisms coöperable with said power mechanism, and pay list mechanisms separate from said computing mechanisms and coöperable therewith; said pay list mechanisms including impression members by which a record may be secured therefrom, substantially as set forth.

3. In an apparatus of the character described, the combination with a time controlled power mechanism, of a wage computing mechanism coöperable with said power mechanism, comprising a movable computing ribbon, driving and pressure rollers for feeding said ribbon; one of said rollers being movable to separate it from said ribbon, and means for moving said movable roller to said ribbon, substantially as set forth.

4. In an apparatus of the character described, the combination with a time controlled power mechanism, of a wage computing mechanism coöperable with said power mechanism, comprising a movable computing ribbon, driving and pressure rollers for feeding said ribbon; one of said rollers being movable to separate it from said ribbon, and means for moving said movable roller away from said ribbon, substantially as set forth.

5. In an apparatus of the character described, the combination with a time controlled power mechanism of a wage computing mechanism coöperable with said power mechanism, comprising a movable computing ribbon, driving and pressure rollers for feeding said ribbon; said pressure roller being movable to separate it from said ribbon, and means for moving said pressure roller to said ribbon, substantially as set forth.

6. In an apparatus of the character described, the combination with a time controlled power mechanism, of a wage computing mechanism coöperable with said power mechanism, comprising a movable computing ribbon, driving and pressure rollers for feeding said ribbon, the pressure roller being movable to and from said ribbon, and an arm whereby said pressure roller may be moved to said ribbon, substantially as set forth.

7. In an apparatus of the character described, the combination with time controlled power mechanism, of a wage computing mechanism coöperable with said power mechanism, comprising a computing ribbon, driving and pressure rollers for feeding said ribbon, the pressure roller being movable to and from said ribbon, and a spring controlled arm by which said pressure roller is separated from said ribbon, substantially as set forth.

8. In an apparatus of the character described, the combination with time controlled power mechanism, of a wage computing mechanism coöperable with said power mechanism, comprising a computing ribbon, driving and pressure rollers for feeding said ribbon, and a spring controlled arm by which said pressure roller is separated from said ribbon; said arm being adapted to receive means whereby it may be moved to carry said roller to said ribbon, substantially as set forth.

9. In an apparatus of the character described, the combination with a time controlled power mechanism, of a wage computing mechanism coöperable with said power mechanism, comprising a computing ribbon, a driving roller and a pressure roller for operating said ribbon, the pressure roller being movable to and from said ribbon and geared to said driving roller, and means by which said pressure roller may be held separated from said ribbon and moved thereto, substantially as set forth.

10. In an apparatus of the character described, a time controlled power mechanism, a series of individual wage computing mechanisms operable by said power mechanism and each including a computing ribbon, driving means for operating said computing ribbon, pay-list mechanisms separate from and arranged for coöperation with said computing mechanisms, shafts in said computing mechanisms having connection with said pay-list mechanisms, means for moving said computing ribbon driving means into operative positions, and means for detachably connecting said computing ribbon driving means to said shaft, substantially as set forth.

11. In an apparatus of the character described, a time controlled power mechanism, a series of individual wage computing mechanisms operable by said power mechanism and each including a computing ribbon, a member for operating said computing ribbon and which is movable to and from the computing ribbon, pay-list mechanism separate from and arranged for coöperation with said computing mechanisms, transfer shafts between said computing mechanisms and pay list mechanisms, means for moving said computing ribbon operating members into operative positions, and means for detachably connecting said computing ribbon operating members to said shafts; said last named means comprising clutches for uniting the shafts and computing ribbon operating members, and means adapted to be operated to shift said clutches into operative positions, substantially as set forth.

12. In an apparatus of the character described, a time controlled power mechanism, a series of individual wage computing mechanisms operable by said power mechanism and including computing ribbons, members for operating said computing ribbons and which are movable to and from the computing ribbons, pay-list mechanisms arranged for coöperation with said computing mechanisms, transfer shafts between said computing mechanisms and said pay-list mechanism, means for moving said computing ribbon operating members into operative positions, clutches whereby said computing ribbon operating members are connected to said transfer shafts, and spring controlled arms adapted to be operated to shift said clutches, substantially as set forth.

13. In an apparatus of the character described, a time controlled mechanism, and a series of individual wage computing mechanisms coöperable with said power mechanism; said time controlled mechanism including stepped driving members whereby the speed at which the computing mechanisms are operated may be varied to compute wages at different rates for specified periods, substantially as set forth.

14. In an apparatus of the character described, a time controlled power mechanism, a series of individual wage computing mechanisms coöperable with said power mechanism, and pay list mechanisms separate from said computing mechanisms and comprising impression ribbons, and means operable by said computing mechanisms for feeding said ribbons, substantially as set forth.

15. In an apparatus of the character described, a time controlled power mechanism, a series of individual wage computing mechanisms coöperable with said power mechanism, and pay list mechanisms separate from said computing mechanisms and comprising impression ribbons, and means operable by said computing mechanisms for feeding said ribbons; said feeding means being operated with a step by step movement, substantially as set forth.

16. In an apparatus of the character described, a time controlled power mechanism, a series of individual wage computing mechanisms coöperable with said power mechanism, and pay list mechanisms separate from said computing mechanisms and comprising impression ribbons, means operable by said computing mechanisms for feeding said ribbons, ink supplying means adjacent to said ribbons, and means whereby said ribbons are normally held separated from said ink supplying means, substantially as set forth.

17. In an apparatus of the character described, a time controlled power mechanism, a series of individual wage computing mechanisms coöperable with said power mechanism, and pay list mechanisms coöperable with said computing mechanisms and comprising impression ribbons, means for feeding said ribbons, ink supplying means adjacent to said ribbons, spring arms adjacent to said ink supplying means, and rollers carried by said spring arms and upon which said ribbons travel to hold them normally out of contact with said ink supplying means, substantially as set forth.

18. In an apparatus of the character described, a time controlled power mechanism, a series of individual wage computing mechanisms coöperable with said power mechanism, transfer shafts coöperable with said computing mechanisms, pay list mechanisms, feed shafts by which said pay list mechanisms are operated, and means whereby said feed shafts are yieldably connected to said transfer shafts, substantially as set forth.

19. In an apparatus of the character described, a time controlled power mechanism, a series of individual wage computing mechanisms coöperable with said power mechanism, transfer shafts coöperable with said computing mechanisms, pay list mechanisms, feed shafts by which said pay list mechanisms are operated, and springs connecting said feed shafts to said transfer shafts, substantially as set forth.

20. In an apparatus of the character described, a time controlled power mechanism, a series of individual wage computing mechanisms coöperable with said power mechanism, transfer shafts coöperable with said computing mechanisms, pay list mechanisms, feed shafts by which said pay list mechanisms are operated, springs connecting said feed shafts to said transfer shafts, and a housing inclosing said springs, substantially as set forth.

21. In an apparatus of the character described, a time controlled power mechanism, a series of individual wage computing mechanisms coöperable with said power mechanism, transfer shafts coöperable with said power mechanisms, pay list mechanisms, feed shafts by which said pay list mechanisms are operated, and volute springs connecting said feed shafts to said transfer shafts, substantially as set forth.

22. In an apparatus of the character described, a time controlled power mechanism, a series of individual wage computing mechanisms coöperable with said power mechanism, transfer shafts coöperable with said power mechanisms, pay list mechanisms, feed shafts by which said pay list mechanisms are operated, volute springs connecting said feed shafts to said transfer shafts, and a housing inclosing said springs, substantially as set forth.

23. In an apparatus of the character described, a time controlled power mechanism, a series of wage computing mechanisms coöperable with said power mechanism, transfer shafts coöperable with said computing mechanisms, pay list mechanisms, feed shafts coöperable with said transfer shafts for operating said pay list mechanisms, and restraining means for yieldingly controlling said feed shafts to cause them to impart step by step movements to said pay list mechanisms, substantially as set forth.

24. In an apparatus of the character described, a time controlled power mechanism, a series of wage computing mechanisms coöperable with said mechanism, transfer shafts coöperable with said computing mechanisms, pay list mechanisms, feed shafts coöperable with said transfer shafts, for operating said pay list mechanisms, and restraining means for yieldingly controlling said feed shafts to cause them to impart step by step movements to said pay list mechanisms; said restraining means comprising toothed wheels carried by the feed shafts, and spring controlled pawls in engagement with said toothed wheels, substantially as set forth.

25. In an apparatus of the character described, a time controlled power mechanism, a series of individual wage computing mechanisms coöperable with said power mechanism, means for resetting said computing mechanisms after they have been operated, a pay roll ribbon, and means operable by said resetting means whereby movement may be imparted to said pay roll ribbon to register the computations made by said computing mechanisms, substantially as set forth.

26. In an apparatus of the character described, a time controlled power mechanism, a series of individual wage computing mechanism coöperable with said power mechanism; resetting mechanism coöperable with said computing mechanisms, comprising a series of controlling members coöperable with said computing mechanisms, a series of drums coöperable with said controlling members, tapes carried by said drums adapted to be dispensed therefrom, and a pay roll registering member arranged to be operated by said resetting mechanism, substantially as set forth.

27. In an apparatus of the character described, a time controlled power mechanism, a series of individual wage computing mechanisms coöperable with said power mechanism; and resetting mechanism coöperable with said computing mechanisms, comprising a series of controlling members coöperable with said computing mechanisms, a series of drums coöperable with said controlling members, tapes carried by said drums adapted to be dispensed therefrom, and a pay roll registering ribbon arranged to be operated by said resetting mechanism, substantially as set forth.

28. In a time actuated wage computing apparatus, a resetting and pay roll mechanism comprising a winding shaft, a series of controlling members loosely mounted upon said winding shaft, means for holding said controlling members individually from rotation upon said shaft, a series of drums coöperable with said controlling members, tapes adapted to be dispensed from said drums, a pay roll member, and means coöperable with said winding shaft for feeding said pay roll member, substantially as set forth.

29. In a time actuated wage computing apparatus, the combination of a series of wage computing mechanisms, and a resetting and pay roll mechanism comprising a winding shaft, controlling members upon said winding shaft adapted to be operated by said computing mechanisms, means operated by said controlling members for registering the degree of operation thereof, a pay roll member, and means adapted to be actuated by said winding shaft for operating said pay roll member, substantially as set forth.

30. In a time actuated wage computing apparatus, the combination with a series of wage computing mechanisms, and a resetting and pay roll mechanism comprising a winding shaft, controlling members upon said winding shaft adapted to be operated by said computing mechanisms, means operated by said controlling members for registering the degree of operation thereof, a pay roll ribbon, and means adapted to be actuated by said winding shaft for operating said pay roll ribbon, substantially as set forth.

31. In a time controlled wage computing apparatus, the combination of a series of wage computing mechanisms, and a resetting and pay roll mechanism comprising a winding shaft, and a series of controlling members loosely mounted upon said winding shaft and adapted to be operated by said computing mechanisms, means adapted to be operated by said controlling members for registering the degrees to which they are operated, means for locking said controlling members individually to said winding shaft, a pay roll member, and means adapted to be actuated by said winding shaft for feeding said pay roll member, substantially as set forth.

32. In a time controlled wage computing apparatus, the combination of a series of wage computing mechanisms, and a resetting and pay roll mechanism, comprising a winding shaft, a series of controlling members loosely mounted upon said winding shaft and adapted to be operated by said computing mechanisms, means adapted to be operated by said controlling members for registering the degrees to which they are operated, means for locking said controlling members individually to said winding shaft, a pay roll ribbon, and means adapted to be actuated by said winding shaft for feeding said pay roll ribbon, substantially as set forth.

33. In a time actuated wage computing apparatus, the combination of a series of wage computing mechanisms, and a resetting and pay roll mechanism comprising a winding shaft, and a series of controlling members loosely mounted on said winding shaft and arranged to be operated by said computing mechanisms, means adapted to be operated by said controlling members to register the degrees in which they are operated, a key shiftably mounted in said winding shaft and adapted to lock said controlling members individually to said shaft, a pay roll member, and means adapted to be operated by said winding shaft for feeding said pay roll member, substantially as set forth.

34. In a time actuated wage computing apparatus, the combination of a series of wage computing mechanisms, and a resetting and pay roll mechanism comprising a winding shaft, and a series of controlling members loosely mounted on said winding shaft and arranged to be operated by said computing mechanisms, means adapted to be operated by said controlling members to register the degrees in which they are operated, a key shiftably mounted in said winding shaft and adapted to lock said controlling members individually to said shaft, a pay roll ribbon, and means adapted to be operated by said winding shaft for feeding said pay roll ribbon, substantially as set forth.

35. In an apparatus of the character described, a time controlled power mechanism, individual wage computing mechanisms coöperable with said power mechanism, means for resetting said computing mechanism after it has been operated, and a pay roll mechanism arranged to be operated by said resetting means; said wage computing mechanisms being provided with transmission shafts operated directly by said power mechanism, and means carried by said transmission shafts arranged to transmit motion therefrom during the operation of the apparatus but adapted to remain inactive for driving action during the resetting of the apparatus, substantially as set forth.

36. In a time controlled wage computing apparatus, the combination of power mechanism, an endless time impression member, means actuated by said power mechanism for operating said time impression member, a frame adjustable relative to the course of movement of said time impression member, a card holder supported by said frame, and means whereby impressions may be secured from said time impression member upon a card placed in said card holder, substantially as set forth.

37. In a time controlled wage computing apparatus, the combination of power mechanism, an endless impression time ribbon, means actuated by said power mechanism for operating said time ribbon, a frame adjustable relative to the course of movement of said time ribbon, a card holder supported by said frame, and means whereby impressions may be secured from said time ribbon upon a card placed in said card holder, substantially as set forth.

38. In a time controlled wage computing apparatus, the combination of power mechanism, an endless time impression member, means actuated by said power mechanism for operating said time impression member, a frame adjustable relative to the course of movement of said time impression member, a card holder shiftably mounted in said frame for movement transversely thereof, and means whereby impressions may be secured from said time impression member upon a card placed in said card holder, substantially as set forth.

39. In a time controlled wage computing apparatus, the combination of power mechanism, an endless impression time ribbon, means actuated by said power mechanism for operating said time ribbon, a frame adjustable relative to the course of movement of said time ribbon, a card holder shiftably mounted in said frame for movement transversely thereof, and means whereby impressions may be secured from said time ribbon upon a card placed in said card holder, substantially as set forth.

FRED. SIMONS.

In presence of—
BLANCHE HOGAN,
H. G. COOK.